US008989484B2

(12) United States Patent
Moon et al.

(10) Patent No.: US 8,989,484 B2
(45) Date of Patent: Mar. 24, 2015

(54) APPARATUS AND METHOD FOR GENERATING HIGH DYNAMIC RANGE IMAGE FROM WHICH GHOST BLUR IS REMOVED USING MULTI-EXPOSURE FUSION

(75) Inventors: Young Su Moon, Seoul (KR); Yong Min Tai, Gunpo-si (KR); Jung Uk Cho, Hwaseong-si (KR); Shi Hwa Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/398,323

(22) Filed: Feb. 16, 2012

(65) Prior Publication Data

US 2013/0028509 A1 Jan. 31, 2013

(30) Foreign Application Priority Data

Jul. 28, 2011 (KR) ........................ 10-2011-0074847

(51) Int. Cl.
*G06K 9/00* (2006.01)
*G06T 5/00* (2006.01)
*H04N 5/235* (2006.01)
*G06T 5/50* (2006.01)

(52) U.S. Cl.
CPC .............. *G06T 5/009* (2013.01); *H04N 5/2355* (2013.01); *G06T 5/50* (2013.01); *G06T 2207/10016* (2013.01); *G06T 2207/10024* (2013.01); *G06T 2207/10144* (2013.01); *G06T 2207/20012* (2013.01); *G06T 2207/20016* (2013.01); *G06T 2207/20076* (2013.01); *G06T 2207/20208* (2013.01); *G06T 2207/20221* (2013.01); *G06T 2207/20064* (2013.01)
USPC .......................................................... 382/162

(58) Field of Classification Search
None
See application file for complete search history.

(56) References Cited

U.S. PATENT DOCUMENTS

| 7,061,524 B2* | 6/2006 | Liu et al. ..................... 348/208.4 |
| 7,142,723 B2* | 11/2006 | Kang et al. .................... 382/254 |
| 2010/0091119 A1* | 4/2010 | Lee ............................ 348/208.4 |

(Continued)

FOREIGN PATENT DOCUMENTS

| EP | 2395748 A2 * | 12/2011 |
| JP | 2005-274689 | 10/2005 |

(Continued)

OTHER PUBLICATIONS

Pedone "Constrain Propagation for Ghost Removal in High Dynamic Range Images" 2008.*

(Continued)

*Primary Examiner* — Vu Le
*Assistant Examiner* — Alexander J Lesnick
(74) *Attorney, Agent, or Firm* — Staas & Halsey LLP

(57) ABSTRACT

An apparatus and method for generating a High Dynamic Range (HDR) image from which a ghost blur is removed based on a multi-exposure fusion. The apparatus may include an HDR weight map calculation unit to calculate an HDR weight map for multiple exposure frames that are received, a ghost probability calculation unit to calculate a ghost probability for each image by verifying a ghost blur for the multiple exposure frames, an HDR weight map updating unit to update the calculated HDR weight map based on the calculated ghost probability, and a multi-scale blending unit to generate an HDR image by reflecting the updated HDR weight map to the multiple exposure frames.

18 Claims, 6 Drawing Sheets

(56) References Cited

U.S. PATENT DOCUMENTS

2010/0271545 A1 10/2010 Mori et al.
2010/0328780 A1 12/2010 Tocci

FOREIGN PATENT DOCUMENTS

| JP | 2010-273001 | 12/2010 |
| JP | 2011-097366 | 5/2011 |
| JP | 2011-100204 | 5/2011 |
| KR | 10-2005-0009694 | 1/2005 |
| KR | 10-2005-0054729 | 6/2005 |
| KR | 10-2005-0040651 | 4/2010 |

OTHER PUBLICATIONS

Mertens "Exposure Fusion" 2007.*
Khan "Ghost Removal in High Dynamic Range Images" 2006.*
Tomaszewska et al. "Dynamic Scenes HDRI Acquisition," 2010.*
Pedone et al. "Constrain Propagation for Ghost Removal in High Dynamic Range Images," 2008.*
Mertens et al. "Exposure Fusion," 2007.*

* cited by examiner

610

620

630

APPARATUS AND METHOD FOR GENERATING HIGH DYNAMIC RANGE IMAGE FROM WHICH GHOST BLUR IS REMOVED USING MULTI-EXPOSURE FUSION

CROSS-REFERENCE TO RELATED APPLICATIONS

This application claims the priority benefit of Korean Patent Application No. 10-2011-0074847, filed on Jul. 28, 2011, in the Korean Intellectual Property Office, the disclosure of which is incorporated herein by reference.

BACKGROUND

1. Field

Example embodiments of the following description relate to an apparatus and method for generating a High Dynamic Range (HDR) image from which a ghost blur is removed based on a multi-exposure fusion, and more particularly, to an apparatus and method that may ensure an HDR image in a high contrast environment by capturing multiple exposure frames and performing HDR restoration.

2. Description of the Related Art

Most existing camera sensors may miss details of scenes existing in nature, since Dynamic Ranges (DR) of the camera sensors are relatively narrow compared to human eyes. For example, when taking a picture against the light, that is, capturing a high contrast scene in which a very bright area with a high illumination coexists with a very dark area with a low illumination, a picture in which details on the very bright area or very dark area almost disappear may be acquired.

In other words, when taking a picture in the high contrast environment, original colors, original tones, and original details appearing in an actual scene may almost disappear in a high illumination area or a low illumination area.

To overcome such a disadvantage, several frames may be captured while changing the exposure, and the captured frames may be fused. Accordingly, it is possible to generate a High Dynamic Range (HDR) image in which original details appear.

However, when a subject, or an object of a background is moving in an HDR image, a deterioration, called "ghost blur," may be caused by a motion during an HDR fusion process, and accordingly, there is a desire for a separate processing method for preventing the ghost blur.

SUMMARY

The foregoing and/or other aspects are achieved by providing an apparatus for generating a High Dynamic Range (HDR) image from which a ghost blur is removed based on a multi-exposure fusion, the apparatus including an HDR weight map calculation unit to calculate an HDR weight map for multiple exposure frames, the multiple exposure frames being received, a ghost probability calculation unit to calculate a ghost probability for each image by verifying a ghost blur for the multiple exposure frames, an HDR weight map updating unit to update the calculated HDR weight map based on the calculated ghost probability, and a multi-scale blending unit to generate an HDR image by reflecting the updated HDR weight map to the multiple exposure frames.

The apparatus may further include a brightness matching unit to determine a reference frame among the multiple exposure frames, and to match at least one brightness of at least one frame among the multiple exposure frames based on the determined reference frame.

Further, the brightness matching unit may determine one of the multiple exposure frames as the reference frame, and may control exposure levels of frames other than the reference frame, and may match brightnesses of the other frames with a brightness of the reference frame.

Moreover, the ghost probability calculation unit may verify the ghost blur for the multiple exposure frames, based on the matched brightness of the at least one frame.

The ghost probability calculation unit may verify a brightness difference value between the reference frame and each of the at least one frame, based on a result of the matching, and may determine that the ghost blur occurs when the brightness difference value is equal to or greater than a threshold.

In addition, the HDR weight map updating unit may modify an HDR weight of a pixel with the calculated ghost probability that is equal to or greater than a threshold, to be lower than an HDR weight of a pixel with the calculated ghost probability that is equal to or less than the threshold, and may update the HDR weight map.

The HDR weight map may store, as an HDR weight, at least one of a contrast, a color saturation, and a well-exposedness in association with a pixel of each of the multiple exposure frames.

Further, the multi-scale blending unit may receive the multiple exposure frames and the HDR weight map, may blend the multiple exposure frames with the HDR weight map using a Gaussian pyramid and a Laplacian pyramid, and may generate the HDR image.

The foregoing and/or other aspects are achieved by providing a method for generating an HDR image from which a ghost blur is removed based on a multi-exposure fusion, the method including calculating, by an HDR weight map calculation unit, an HDR weight map for multiple exposure frames, the multiple exposure frames being received, calculating, by a ghost probability calculation unit, a ghost probability for each image by verifying a ghost blur for the multiple exposure frames, updating, by an HDR weight map updating unit, the calculated HDR weight map based on the calculated ghost probability, and generating, by a multi-scale blending unit, an HDR image by reflecting the updated HDR weight map to the multiple exposure frames.

Further, the method may include determining, by a brightness matching unit, a reference frame among the multiple exposure frames, and matching at least one brightness of at least one frame, among the multiple exposure frames, based on the determined reference frame.

The method may also include determining one of the multiple exposure frames as the reference frame, controlling exposure levels of frames other than the reference frame, and matching brightnesses of the other frames with a brightness of the reference frame.

The verifying of the ghost blur for the multiple exposure frames, may be based on the matched brightness of the at least one frame.

The method may include verifying a brightness difference value between the reference frame and each of the at least one frame, based on a result of the matching, and determining that the ghost blur occurs when the brightness difference value is equal to or greater than a threshold.

Further, the updating may include modifying an HDR weight of a pixel with the calculated ghost probability that is equal to or greater than a threshold, to be lower than an HDR weight of a pixel with the calculated ghost probability that is equal to or less than the threshold, and updating the HDR weight map.

Moreover, the HDR weight map may store, as an HDR weight, at least one of a contrast, a color saturation, and a well-exposedness in association with a pixel of each of the multiple exposure frames.

In addition, the generating may include receiving the multiple exposure frames and the HDR weight map, blending the multiple exposure frames and the HDR weight map using a Gaussian pyramid and a Laplacian pyramid, and generating the HDR image.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
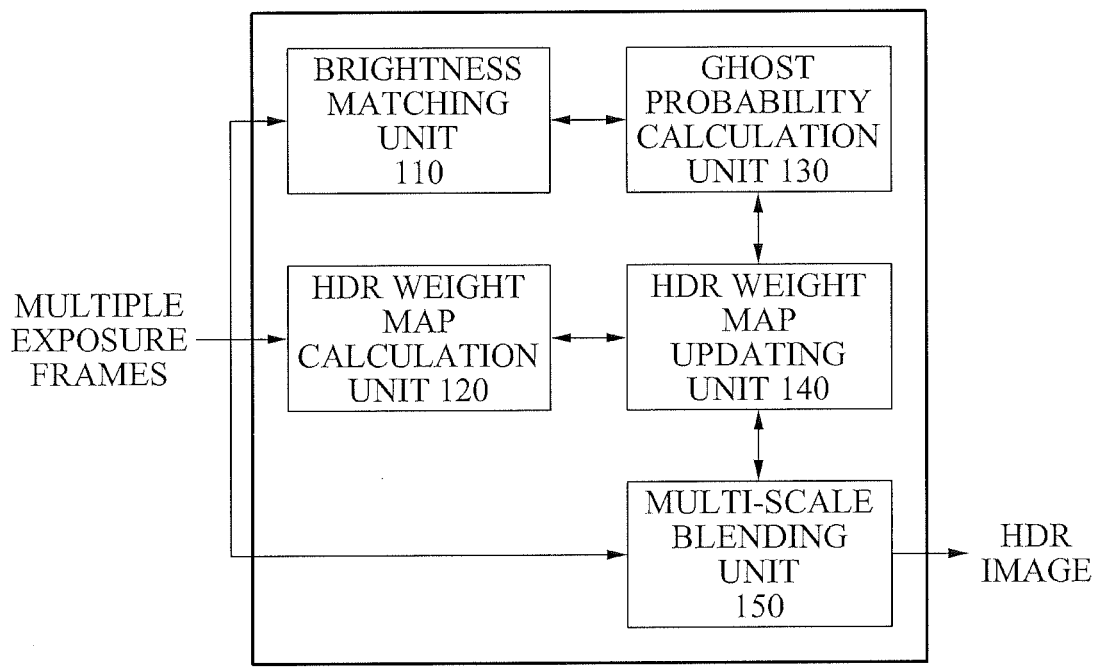
FIG. 1 illustrates a block diagram of a High Dynamic Range (HDR) image generation apparatus, according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a block diagram of a High Dynamic Range (HDR) image generation apparatus 100, according to example embodiments.

The HDR image generation apparatus 100 may capture multiple exposure frames, may perform HDR restoration, and may ensure an HDR image in a high contrast environment.

Specifically, the HDR image generation apparatus 100 may relatively simply composite HDR images based on different weights for each pixel of an image, without separately restoring HDR radiance values, and at the same time may remove a ghost blur caused by a moving object in a scene. Accordingly, the HDR images may be effectively composited.

The HDR image generation apparatus 100 may be applied to a camera for Distributed Source Coding (DSC), a camera for Distributed Video Coding (DVC), a camera for monitoring, a mobile camera phone, a smartphone, a camera sensor image signal processor, such as, an Image Signal Processor (ISP), a Digital Signal Processor (DSP), for example, and image processing software for Personal Computer (PC), and the like.

As shown in FIG. 1, the HDR image generation apparatus 100 may include a brightness matching unit 110, an HDR weight map calculation unit 120, a ghost probability calculation unit 130, an HDR weight map updating unit 140, and a multi-scale blending unit 150.

The brightness matching unit 110 may determine a reference frame among multiple exposure frames that are received, and may match at least one brightness of at least one frame among the multiple exposure frames, based on the reference frame.

In an example, the brightness matching unit 110 may determine one of the multiple exposure frames as a reference frame, may control exposure levels of frames other than the reference frame, and may match brightnesses of the other frames with a brightness of the reference frame.

In another example, the brightness matching unit 110 may set one of input frames as a reference frame, and may change brightnesses of frames other than the reference frame, based on an exposure level of the reference frame.

In this example, the brightness matching unit 110 may calculate a Brightness Transfer Function (BTF) between exposure frames other than the reference frame, based on the reference frame that is set, to realize a brightness matching function, and may perform brightness transfer from a reference frame of each exposure image, such that brightness may be matched.

In still another example, the brightness matching unit 110 may perform brightness matching by applying a histogram matching process.

When the histogram matching process is applied, the brightness matching may be enabled, despite incorrect matching of geometric positions of frames.

Accordingly, the brightness matching unit 110 may calculate a histogram of a reference frame, and histograms of frames other than the reference frame, and may obtain a transfer function that enables each of the histograms of the other frames to be similar to the histogram of the reference frame.

Using the obtained transfer function in the form of a Lookup Table (LUT), the other frames may be transformed to an image with a similar brightness to a brightness of the reference frame.

An example of brightness transfer will be further described with reference to FIG. 4.

The HDR weight map calculation unit 120 may calculate an HDR weight map for the multiple exposure frames.

The HDR weight map may store, as an HDR weight, at least one piece of information among a contrast, a color saturation, and a well-exposedness in association with a pixel of each of the multiple exposure frames.

The HDR weight map calculation unit 120 may calculate an HDR weight map $W_{i,j,k}$ for each of the multiple exposure frames, using Equation 1.

$$W_{i,j,k} = (C_{i,j,k})^{wc} \times (S_{i,j,k})^{ws} \times (E_{i,j,k})^{we} \quad \text{[Equation 1]}$$

In Equation 1, $(C_{i,j,k})^{wc}$, $(S_{i,j,k})^{ws}$, and $(E_{i,j,k})^{we}$ respectively denote a contrast, a color saturation, and a well-exposedness of a pixel (i, j) in an k-th exposure frame among the multiple exposure frames.

Additionally, constants of exponents wc, ws, and we may be set to "0" or "1."

The ghost probability calculation unit 130 may calculate a ghost probability for each image, by verifying a ghost blur for the multiple exposure frames.

In an example, the ghost probability calculation unit 130 may verify a ghost blur for the multiple exposure frames, based on the matched brightness of the at least one frame in the multiple exposure frames.

In another example, the ghost probability calculation unit 130 may verify a brightness difference value between the reference frame and each of the at least one frame, based on a result of matching the brightness. When the brightness difference value is equal to or greater than a threshold, the ghost probability calculation unit 130 may determine that the ghost blur occurs.

For example, the ghost probability calculation unit 130 may calculate a ghost probability $M_{ij,k}$ for each exposure image, using a difference between a reference frame and exposure frames having a matched brightness.

The ghost probability $M_{ij,k}$ may be computed using Equation 2.

$$M_{ij,k} = \exp\left(-\frac{(I_{ij,\#ref} - I'_{ij,k})}{2 \cdot c_n \cdot \sigma_n^2}\right) \quad \text{[Equation 2]}$$

In Equation 2, "exp( )" denotes an exponential function, $\sigma_n^2$ denotes a noise level, and $c_n$ denotes a threshold control constant.

The ghost probability calculation unit 130 may calculate a ghost probability for an image, using a gradient difference, instead of a brightness difference.

For example, the brightness matching unit 110 may change an input image to a gradient image, using a Sobel gradient operator, for example, instead of matching a brightness.

Using a gradient difference between the reference frame and each of exposure frames, the HDR weight map calculation unit 120 may calculate an HDR weight map for each image.

Accordingly, the ghost probability calculation unit 130 may calculate a ghost probability for each pixel by applying a probability concept in the same manner as a brightness difference concept used in Equation 2.

In other words, the ghost probability calculation unit 130 may define various image differences, such as, an entropy difference, in addition to the brightness difference and the gradient difference, and may calculate a possibility that each pixel corresponds to a ghost area, based on a probability concept, such as, the concept of Equation 2.

The HDR weight map updating unit 140 may update the calculated HDR weight map, based on the calculated ghost probability.

Additionally, the HDR weight map updating unit 140 may modify an HDR weight of a pixel with the calculated ghost probability that is equal to or greater than a threshold, to be lower than an HDR weight of a pixel with the calculated ghost probability that is equal to or less than the threshold, and may update the HDR weight map.

For example, the HDR weight map updating unit 140 may update the HDR weight map $W_{ij,k}$, using the calculated HDR weight map and the calculated ghost probability associated with the ghost blur.

Specifically, the HDR weight map updating unit 140 may apply the ghost probability to an HDR weight map $(W_g)_{ij,k}$, using Equation 3, and may control a weighted sum in pixels of each frame to be "1" through a series of normalization, using Equation 4.

$$(W_g)_{ij,k} = f(W_{ij,k}, M_{ij,k}) \quad \text{[Equation 3]}$$

$$(\hat{W}_g)_{ij,k} = \left[\sum_{k'=1}^{N}(W_g)_{ij,k}\right]^{-1}(W_g)_{ij,k} \quad \text{[Equation 4]}$$

In Equations 3 and 4, "k" denotes a predetermined exposure frame, and "ij" denotes a pixel position.

The multi-scale blending unit 150 may generate an HDR image by reflecting the updated HDR weight map to the multiple exposure frames.

Specifically, the multi-scale blending unit 150 may receive the multiple exposure frames and the HDR weight map, may blend the multiple exposure frames with the HDR weight map using a Gaussian pyramid and a Laplacian pyramid, and may generate the HDR image.

The multi-scale blending unit 150 may receive 8-bit multiple exposure frames and the updated HDR weight map, may blend the 8-bit multiple exposure frames with the updated HDR weight map, and may finally output an 8-bit HDR image, using Equation 5.

$$L\{R\}_{ij}^l = \sum_{k=1}^{N} G\{\hat{W}_g\}_{ij,k}^l \cdot L\{I\}_{ij,k}^l \quad \text{[Equation 5]}$$

In Equation 5, G{ } denotes a Gaussian pyramid, and L{ } denotes a Laplacian pyramid.

Additionally, "k" denotes a predetermined exposure frame, "ij" denotes a pixel position, and "l" denotes a predetermined level in a pyramid. Additionally, "I" denotes an input exposure frame, "Wg" denotes an HDR weight map, and "R" denotes a composite HDR image.

Thus, the HDR image generation apparatus 100 may solve a ghost blur problem through a more simple process by using, as a motion detection characteristic, a deviation between original exposure frames with different brightnesses and exposure frames with a matched brightness, instead of using a Median Threshold Bitmap (MTB) image.

Additionally, compared with a conventional art, the HDR image generation apparatus 100 may directly compute a weighted average, without restoring an HDR radiance map and without performing a tone compression operation to form the restored HDR radiance map with an 8-bit HDR, and may obtain a final result.

Accordingly, when the HDR image generation apparatus 100 is used, a calculation amount may be reduced, and thus, it may be possible to reduce a processing speed and processing cost and to preserve colors.

Furthermore, a multi-frame fusion technology, basically achieved by the HDR image generation apparatus 100, may be applied to various computational photography technologies, such as, multi-focusing as well as an HDR. Additionally, the HDR image generation apparatus 100 may be widely used in a multi-sensor fusion, and a multi-mode fusion in a medical imaging field.

Figure 2:
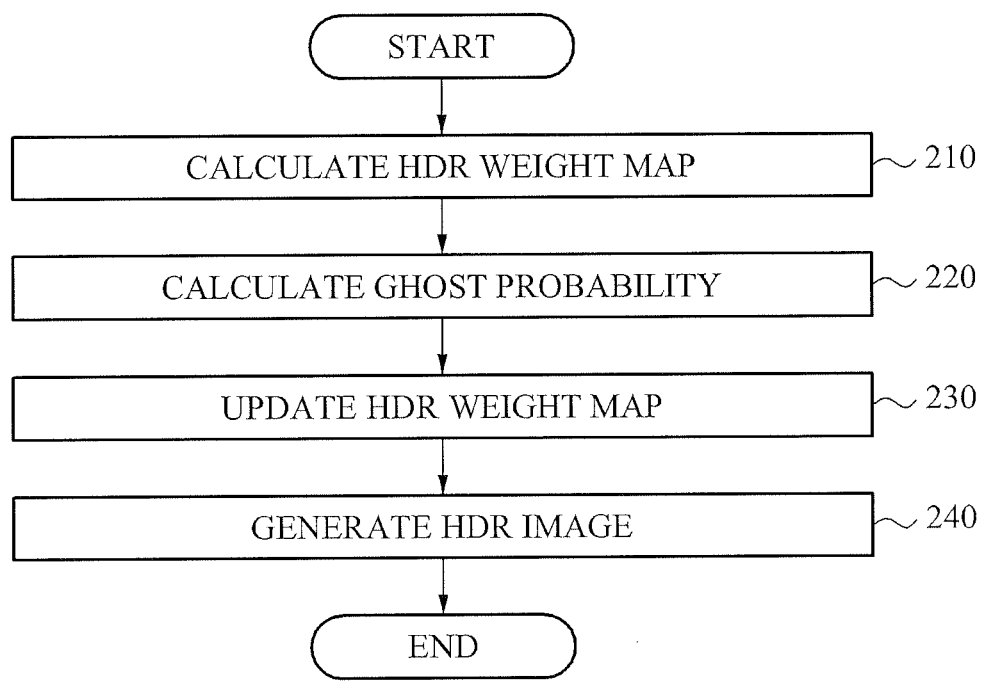
FIG. 2 illustrates a flowchart of an HDR image generation method, according to example embodiments.

FIG. 2 illustrates a flowchart of an HDR image generation method, according to example embodiments.

Referring to FIG. 2, in operation 210, an HDR weight map may be calculated.

The HDR weight map may store, as an HDR weight, at least one piece of information among a contrast, a color saturation, and a well-exposedness in association with a pixel of each of the multiple exposure frames. In the HDR image generation method, a pixel of a frame may be verified, and the HDR weight map may be calculated.

In operation 220, a ghost probability may be calculated for each image by verifying a ghost blur.

Figure 3:
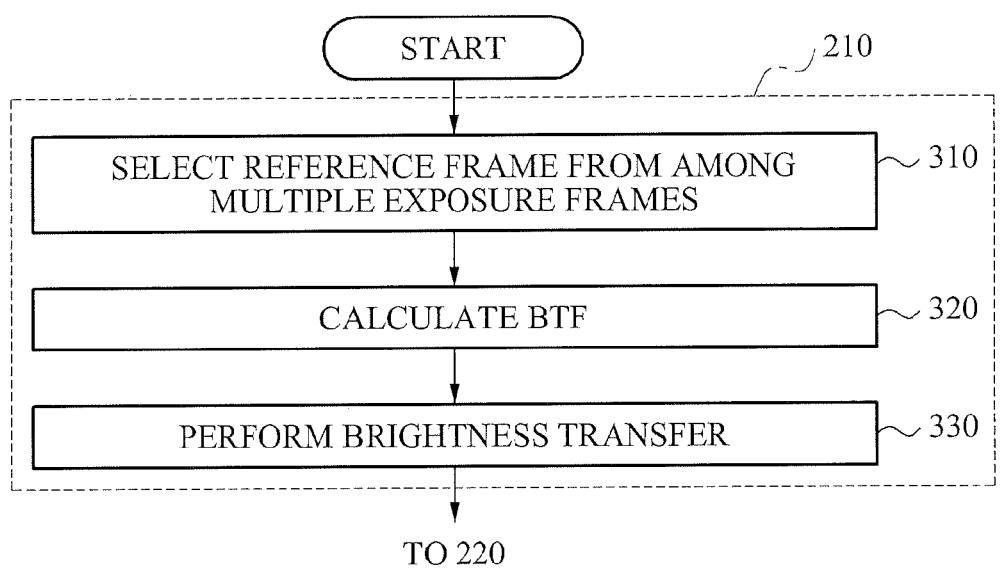
FIG. 3 illustrates a flowchart of an operation by which a brightness matching unit matches brightness in the method of FIG. 2.

To calculate a ghost probability for each image, brightness matching may be performed, as shown in FIG. 3.

FIG. 3 illustrates a flowchart of operation 210 of FIG. 2.

Referring to FIG. 3, a brightness matching unit, according to example embodiments may select a reference frame from among multiple exposure frames that are received in operation 310, may calculate a BTF between frames other than the reference frame in operation 320, and may perform brightness transfer on the other frames, based on the reference frame in operation 330.

Referring back to FIG. 2, in operation 220, the ghost probability may be calculated, based on the other frames on which the brightness transfer is performed using the reference frame.

In operation 230, the HDR weight map may be updated based on the calculated ghost probability.

For example, a ghost probability associated with a ghost blur may be applied to an HDR weight map, and a weighted sum in pixels of each frame may be controlled to be "1" through a series of normalization of the HDR weight map to which the ghost probability is applied, so that the HDR weight map may be updated.

In operation 240, an HDR image may be generated, based on the updated HDR weight map.

In the HDR image generation method, the multiple exposure frames and the HDR weight map may be received, and may be blended using the Gaussian pyramid and Laplacian pyramid, so that the HDR image may be generated.

Figure 4:
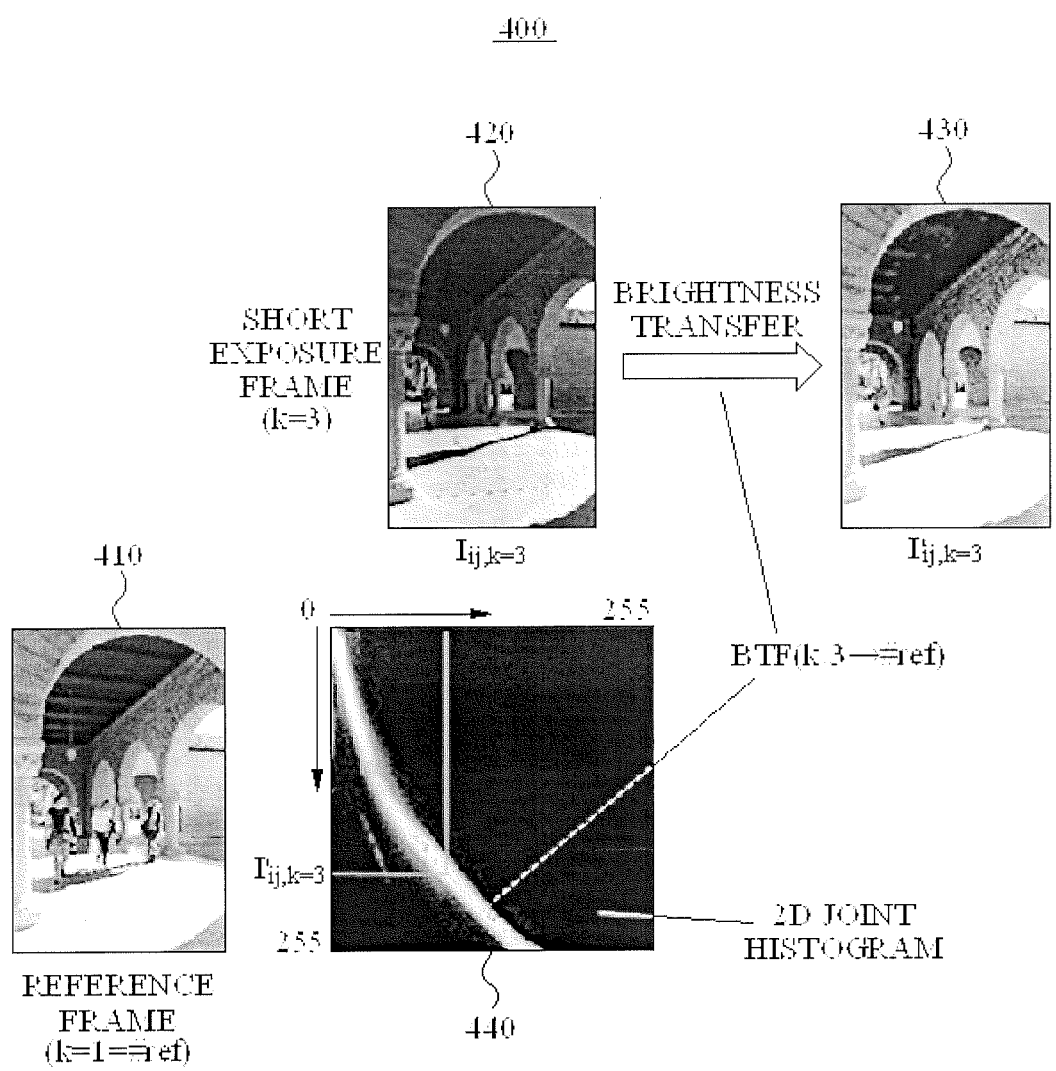
FIG. 4 illustrates a diagram of operations of a brightness matching unit and a ghost probability calculation unit, according to example embodiments.

FIG. 4 illustrates a diagram of operations of a brightness matching unit 110 and a ghost probability calculation unit 130, according to example embodiments.

The brightness matching unit 110 may set one of input frames as a reference frame, and may change brightnesses of frames other than the reference frame, based on an exposure level of the reference frame.

Accordingly, the brightness matching unit 110 may select one of input frames as a reference frame, based on system characteristics.

Specifically, when three exposure frames are received, the brightness matching unit 110 may set a long exposure frame (k=1) to be a reference frame 410, and may match a brightness of a short exposure frame 420 (k=3) with a brightness of the reference frame 410.

A two-dimensional (2D) joint histogram 440 may be computed using two exposure frames, namely, the reference frame 410 and the short exposure frame 420, and thus, a BTF represented by a curve may be estimated using a curve-fitting process.

In the 2D joint histogram 440, a vertical axis represents a pixel brightness value of the reference frame 410, and a horizontal axis represents a pixel brightness value of another exposure frame that is to be matched.

Accordingly, the 2D joint histogram 440 may be obtained by voting all pairs of brightness values in the same pixels in the reference frame 410 and the short exposure frame 420.

When a BTF (k:3→#ref) to the reference frame 410 is determined, pixel values respectively corresponding to all pixels of the short exposure frame 420 may be determined. In the BTF, "#ref" indicates a number of the reference frame 410.

A pixel value "$l_{ij,k}$" of the short exposure frame 420 may be mapped by the BTF (k:3→#ref) to a brightness value "$l'_{ij,k}$" in an exposure level of the reference frame 410, and accordingly, an exposure image 430 with the matched brightness may be generated.

Figure 5:
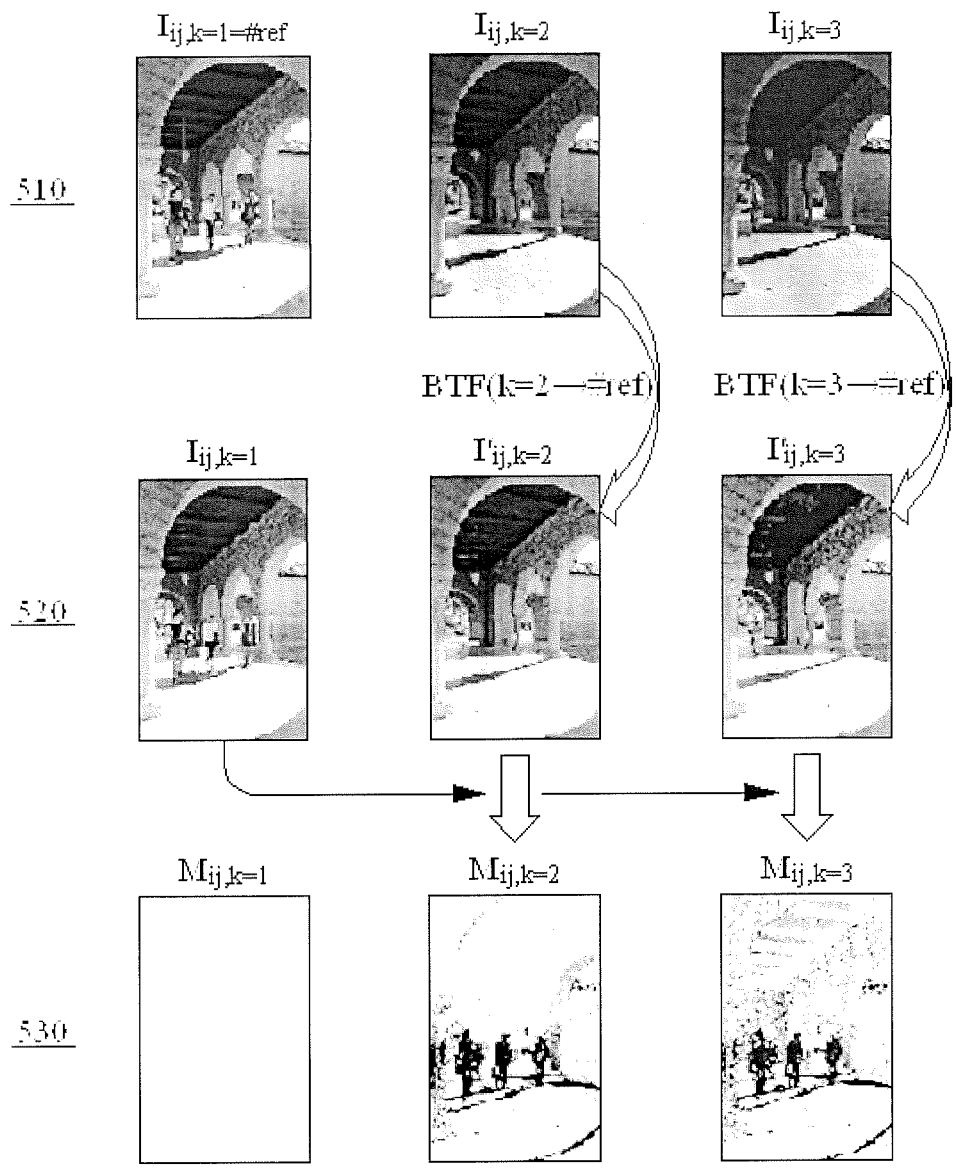
FIG. 5 illustrates a diagram of an operation of an HDR weight map calculation unit according to example embodiments.

FIG. 5 illustrates a diagram of an operation of an HDR weight map calculation unit, according to example embodiments.

Specifically, FIG. 5 illustrates an intermediate result and a final result of calculating an HDR weight map, in an example in which multiple exposure frames including three frames are inputted.

In FIG. 5, "$l_{ij,k=1}$," "$l_{ij,k=2}$," and "$l_{ij,k=3}$," respectively indicate a long exposure frame, a middle exposure frame, and a short exposure frame.

Additionally, input images may be classified into a multi-exposure input image 510, a brightness transfer image 520, and a ghost probability map 530. A long exposure frame, among frames of each of the input images, may be set as a reference frame.

The multi-exposure input image 510 may show three input frames, and the brightness transfer image 520 may show a result obtained by matching brightness of frames, based on a long exposure frame.

The ghost probability map 530 may be obtained using a difference between a reference frame and each of frames other than the reference frame in the brightness transfer image 520.

Figure 6:
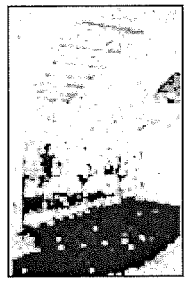
FIG. 6 illustrates a diagram of an example in which a multi-scale blending unit blends frames and generates an HDR image, according to example embodiments.
Figure 6:
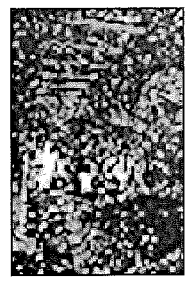
Figure 6:
Figure 6:
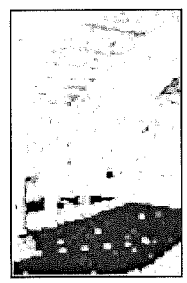
Figure 6:
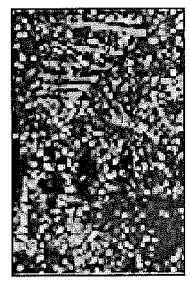
Figure 6:
Figure 6:

FIG. 6 illustrates a diagram of an example in which a multi-scale blending unit blends frames and generates an HDR image, according to example embodiments.

Specifically, FIG. 6 also illustrates an intermediate result and a final result of generating an HDR image, in an example in which multiple exposure frames including three frames are inputted.

In FIG. 6, an HDR weight map 610 may be calculated for each input exposure frame shown in the multi-exposure input image 510 of FIG. 5.

Additionally, an updated HDR weight map 620 may be obtained by updating the HDR weight map 610 by correcting a ghost based on the ghost probability map 530 of FIG. 5. Furthermore, an HDR result image 630 may show a result of blending the three frames.

Thus, using the HDR image generation method, according to example embodiments, it may be possible to solve a ghost blur problem through a more simple process by using, as a motion detection characteristic, a deviation between original exposure frames with different brightnesses and exposure frames with a matched brightness, instead of using an MTB image.

Additionally, using the HDR image generation method, according to example embodiments, compared with a conventional art, it may be possible to directly compute a weighted average, without restoring an HDR radiance map and without performing a tone compression operation to form the restored HDR radiance map with an 8-bit HDR, and to obtain a final result.

The HDR image generation method, according to the above-described example embodiments, may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Further, according to an aspect of the embodiments, any combinations of the described features, functions and/or operations can be provided.

Moreover, the HDR image generation apparatus, as shown in FIG. 1, for example, may include at least one processor to execute at least one of the above-described units and methods.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus for generating a High Dynamic Range (HDR) image from which a ghost blur is removed based on a multi-exposure fusion, the apparatus comprising:
    an HDR weight map calculation unit, including at least one processing device, to calculate an HDR weight map for received multiple exposure frames;
    a ghost probability calculation unit to calculate a ghost probability for each image based on a difference in a brightness or a gradient between a reference frame and at least one frame among the multiple exposure frames, at least one brightness of the at least one frame being matched;
    an HDR weight map updating unit to update the calculated HDR weight map based on the calculated ghost probability; and
    a multi-scale blending unit to generate an HDR image by reflecting the updated HDR weight map to the multiple exposure frames,
    wherein the HDR weight map updating unit updates the calculated HDR weight map by applying pixels of the calculated ghost probability to respective pixels of the calculated HDR weight map, such that ghost probabilities are uniquely calculated per pixel, and
    wherein the ghost probability calculation unit calculates the ghost probability based on a ratio of the difference in the brightness to both a noise level and a threshold control constant.

2. The apparatus of claim 1, further comprising:
    a brightness matching unit to determine the reference frame among the multiple exposure frames, and to match at least one brightness of at least one frame among the multiple exposure frames, based on the determined reference frame.

3. The apparatus of claim 2, wherein the brightness matching unit determines one of the multiple exposure frames as the reference frame, changes brightnesses of frames other than the reference frame, based on the exposure level of the reference frame, and matches the brightnesses of the other frames with a brightness of the reference frame.

4. The apparatus of claim 2, wherein the ghost probability calculation unit verifies the ghost blur for the multiple exposure frames, based on the matched brightness of the at least one frame.

5. The apparatus of claim 4, wherein the ghost probability calculation unit verifies a brightness difference value between the reference frame and each of the at least one frame, based on a result of the matching, and determines that the ghost blur occurs when the brightness difference value is equal to or greater than a threshold.

6. The apparatus of claim 1, wherein the HDR weight map updating unit modifies an HDR weight of a pixel with the calculated ghost probability that is equal to or greater than a threshold, to be lower than an HDR weight of a pixel with the calculated ghost probability that is equal to or less than the threshold, and updates the HDR weight map.

7. The apparatus of claim 6, wherein the HDR weight map stores, as an HDR weight, at least one of a contrast, a color saturation, and a well-exposedness in association with a pixel of each of the multiple exposure frames.

8. The apparatus of claim 1, wherein the multi-scale blending unit receives the multiple exposure frames and the HDR weight map, blends the multiple exposure frames with the HDR weight map using a Gaussian pyramid and a Laplacian pyramid, and generates the HDR image.

9. A method for generating a High Dynamic Range (HDR) image from which a ghost blur is removed based on a multi-exposure fusion, the method comprising:
    calculating, by an HDR weight map calculation unit, an HDR weight map for received multiple exposure frames;
    calculating, by a ghost probability calculation unit, a ghost probability for each image based on a difference in a brightness or a gradient between a reference frame and at least one frame among the multiple exposure frames, at least one brightness of the at least one frame being matched;
    updating, by an HDR weight map updating unit, the calculated HDR weight map based on the calculated ghost probability; and
    generating, by a multi-scale blending unit, an HDR image by reflecting the updated HDR weight map to the multiple exposure frames,
    wherein the updating comprises updating the calculated HDR weight map by applying pixels of the calculated ghost probability to respective pixels of the calculated HDR weight map, such that ghost probabilities are uniquely calculated per pixel, and
    wherein the ghost probability calculation unit calculates the ghost probability based on a ratio of the difference in the brightness to both a noise level and a threshold control constant.

10. The method of claim 9, further comprising:
    determining, by a brightness matching unit, the reference frame among the multiple exposure frames, and matching at least one brightness of at least one frame, among the multiple exposure frames, based on the determined reference frame.

11. The method of claim 10, further comprising determining one of the multiple exposure frames as the reference frame, changing brightnesses of frames other than the reference frame, based on an exposure level of the reference frame, and matching the brightnesses of the other frames with a brightness of the reference frame.

12. The method of claim 10, further comprising verifying the ghost blur for the multiple exposure frames, based on the matched brightness of the at least one frame.

13. The method of claim 12, further comprising verifying a brightness difference value between the reference frame and each of the at least one frame, based on a result of the matching, and determining that the ghost blur occurs when the brightness difference value is equal to or greater than a threshold.

14. The method of claim 9, wherein the updating comprises modifying an HDR weight of a pixel with the calculated ghost probability that is equal to or greater than a threshold, to be lower than an HDR weight of a pixel with the calculated ghost probability that is equal to or less than the threshold, and updating the HDR weight map.

15. The method of claim 14, wherein the HDR weight map stores, as an HDR weight, at least one of a contrast, a color saturation, and a well-exposedness in association with a pixel of each of the multiple exposure frames.

16. The method of claim 9, wherein the generating comprises receiving the multiple exposure frames and the HDR weight map, blending the multiple exposure frames and the HDR weight map using a Gaussian pyramid and a Laplacian pyramid, and generating the HDR image.

17. The apparatus of claim 1, wherein the HDR weight map updating unit controls a weighted sum in pixels of each frame to be "1" through a series of normalizations.

18. The apparatus of claim 1, wherein the ghost blur is removed by determining, as a motion detection characteristic, a deviation between original exposure frames with different brightnesses and exposure frames with a matched brightness.

\* \* \* \* \*